United States Patent [19]
Harvie et al.

[11] Patent Number: 5,693,405
[45] Date of Patent: Dec. 2, 1997

[54] MASKING FILM HAVING EMBOSSED AREAS AND UNEMBOSSED AREAS

[75] Inventors: William Edwin Harvie, Richmond, Va.; Tung-Yao Weng, Terre Haute, Ind.

[73] Assignee: Tredegar Industries, Inc., Richmond, Va.

[21] Appl. No.: 372,321

[22] Filed: Jan. 13, 1995

[51] Int. Cl.[6] .................................................. B32B 3/00
[52] U.S. Cl. .................................... 428/156; 428/172
[58] Field of Search .............................. 428/156, 172, 428/192; 264/284, 509, 503, 167; 425/363, 365, 385, 335

[56] References Cited

U.S. PATENT DOCUMENTS

| | | | |
|---|---|---|---|
| 2,697,893 | 12/1954 | Schaum | 428/167 |
| 4,021,179 | 5/1977 | Pira et al. | 425/369 |
| 4,234,300 | 11/1980 | Yamagisi et al. | 425/363 |
| 4,895,760 | 1/1990 | Barger | 428/332 |
| 5,024,799 | 6/1991 | Harp et al. | 264/284 |
| 5,100,709 | 3/1992 | Barger et al. | 428/41 |
| 5,108,814 | 4/1992 | Harp et al. | 428/156 |
| 5,393,589 | 2/1995 | Zeller et al. | 428/192 |
| 5,401,563 | 3/1995 | Kurata et al. | 428/212 |

*Primary Examiner*—Donald Loney
*Attorney, Agent, or Firm*—Emch, Schaffer, Schaub & Porcello Co., L.P.A.

[57] ABSTRACT

An embossed thermoplastic film having a first side having a substantially smooth surface and a second side having a partially embossed surface on its surface.

17 Claims, 2 Drawing Sheets

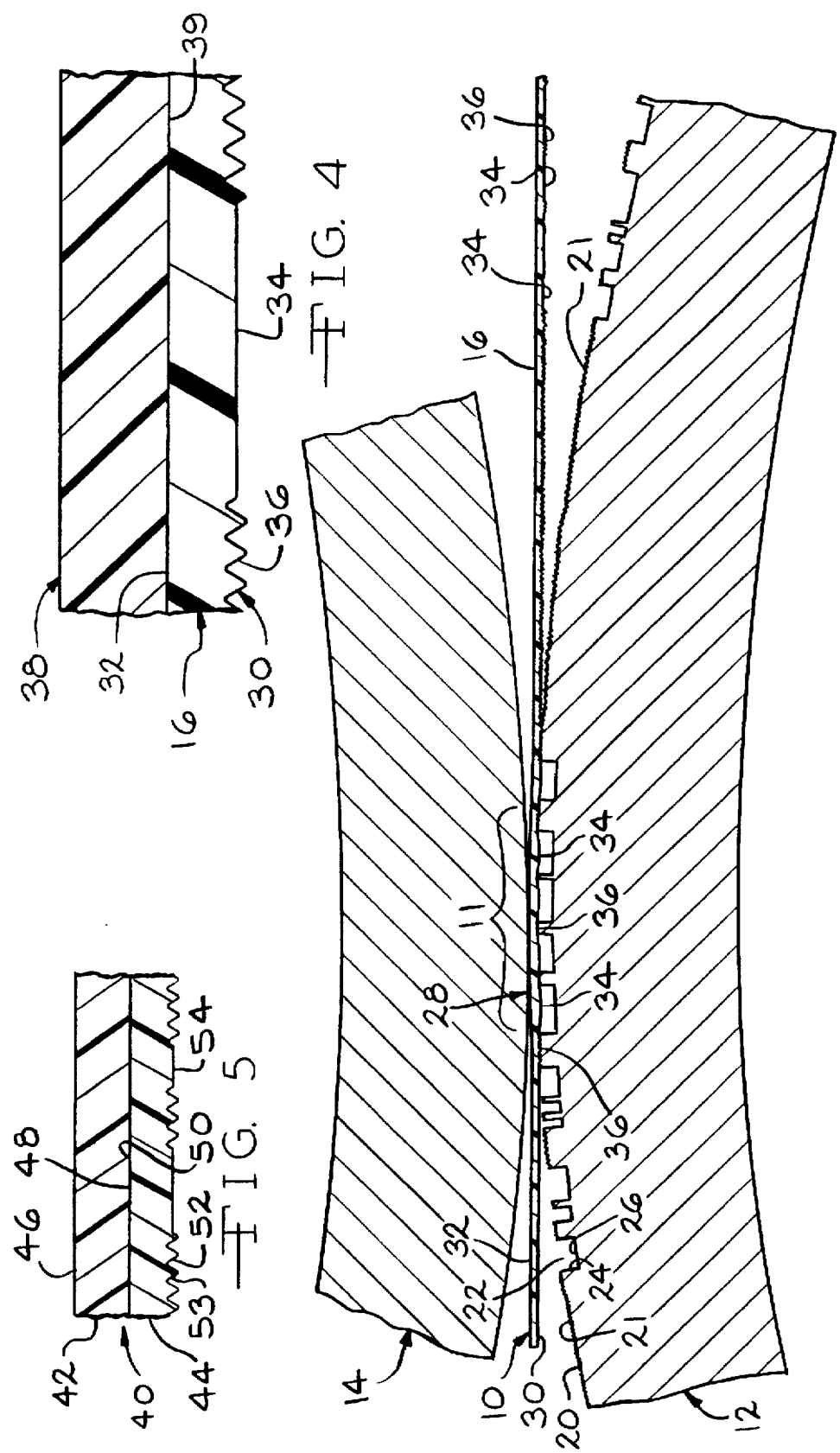

MASKING FILM HAVING EMBOSSED AREAS AND UNEMBOSSED AREAS

TECHNICAL FIELD

The present invention relates to a one side matte embossed film having interruptions or unembossed areas which form a predetermined desired pattern on one side of the film. The present invention is especially useful as a masking film.

BACKGROUND OF THE INVENTION

The function of a masking film is to form a protective cover to prevent scratching or distortions on a smooth surface of a substrate being protected. This protective cover is necessary for shipment and/or during further fabrication of the product having the smooth surface. One type of masking film comprises a non-embossed, low slip, low density polyethylene film which, in certain embodiments, has been coated with a pressure sensitive adhesive.

Other masking covers are paper based and have a pressure sensitive adhesive on one side of the masking cover. Frequently, however, humidity from the air permeates the masking cover and causes delamination between the paper and the adhesive material. This allows the adhesive to remain on the underlying product after the masking cover has been removed. This adhesive must then be separately removed by rubbing the surface or by washing with a suitable solvent.

One effective masking film is disclosed in Barger, U.S. Pat. No. 4,895,760, assigned to Tredegar Industries, Inc. of Richmond, Va., the same assignee as the present invention. The masking film is a one sided random matte embossed film produced by compression of molten polyethylene between a polished chrome roll and a rubber roll.

The present invention now provides an improvement over the aforementioned patent by providing an embossed film having interruptions or unembossed areas which form desirable patterns on the masking film. In certain embodiments, the patterned embossed material can comprise useful written information or artistic patterns.

In many cases, it is desirable that plastic films are printed with various information or designs used for identification, instructions and/or decorations. The printing technology used in printing on plastic film is well advanced and can utilize water based, solvent based or ultra-violet (UV) curable inks. UV curable inks are inks which are dried (cross-linked) upon exposure to UV radiation. A typical flexographic printing process involves unwinding rolls of film, controlling tension of the path of the film, printing the film, drying or curing of the printed film and final rewinding of the film. Pre-printing of film involves many process development steps which include: printing plates preparation, mounting and proofing of the plates, ink formulation, ink adhesion to substrate, press adjustment, etc. These process development steps make printing of films very time consuming and require much experience to achieve a high quality of printing.

Therefore, it is the primary object of the present invention to provide a one side matte embossed film having patterned interruptions or unembossed areas thereon. The film of the present invention is especially useful for providing identification and/or instructions on film without need for printing on a film.

It is therefore another object of the present invention to provide an improved method for supplying a film having embossed areas and unembossed areas thereon.

It is still another object of the present invention to provide a masking film comprising a film having a smooth side and an embossed side having interruptions or unembossed areas thereon.

It is still another object of the present invention to provide a substrate having a masked film of the present invention.

DISCLOSURE OF THE INVENTION

This invention concerns a one side matte embossed film having patterned interruptions or unembossed areas thereon, a method for making the patterned embossed film, and the use of such patterned embossed film in masking applications. Current problems in the prior art area of masking substrates are solved using the film of the present invention.

The film of the present invention is useful for protecting a product or article. One side of the film has a smooth or glossy surface, while the other side of the film has a patterned matte surface. The matte surface side of the film has embossed areas and unembossed areas.

The film of the present invention achieves a constant controlled adhesion level to any desired smooth substrate, yet the masking film can readily be removed from the substrate. Another advantage of using the one side matte patterned embossed film is that the film does not block on a roll or wrinkle during winding. The patterned embossed side of the film traps a quantity of air between wound layers of film as the film is being wound onto the roll. This air entrapment also facilitates the wrinkle-free unwinding of the film from the roll as it is being applied to a substrate.

According to one aspect of the present invention, the one side patterned matte embossed film can be a monolayer or coextruded material. The one side pattern matte embossed film can be applied to any substrate having a rigid or hard, smooth substrate such as the surface of plastic films and sheets, including such surfaces as rigid polycarbonate Lexan® film or sheet, or acrylics such as Plexiglass® acrylic sheet and/or other thermoplastic or thermoset materials. In addition, the films of the present invention are also useful for masking other substrates having a substantially smooth surface such as plastics, glass, glazed stone wear, polished or painted metals or any other smooth surface.

Further, when it is desired to apply masking films to both sides of a substrate, it is now possible to readily differentiate each side of the substrate by applying a masking film of the present invention to one side of the substrate while using another type of masking film on the opposite side of the substrate.

Another advantage of the present invention is that the pattern decoration on the one side matte patterned embossed film can comprise written instructions or other desired written information. The patterned matte surface of the film comprises predetermined unembossed portions of the film while other predetermined portions are matte embossed, as will be fully understood by referring to the drawings and description below. The unembossed portions visually appears smooth, while the remaining embossed portions of the masking film have a matte finish. In preferred embodiments, the pattern decoration on the embossed film can provide brand identification and/or written marketing, instructional or advertising materials.

Another aspect of the present invention comprises a method for making the film by using an embossing roll having a predetermined design or pattern on the resilient rubber or other elastomeric-type material embossing roll to form the film. One method for forming the pattern on the embossing roll comprises attaching predesigned molded rubber plates or photopolymer plates on an embossing cylinder or sleeve.

Another method for providing an embossed design or an embossing roll includes using a selective solvent or chemical etching to remove portions of elastomeric material from the embossing roll.

Still another method comprises removing selected portions of the embossing roll using mechanical abrasion or indentation by sandblasting or blasting by gases compressed at cryogenic temperatures. Useful gases include carbon dioxide, helium and argon.

Yet another method for achieving an embossed design is to mechanically or manually engrave a desired pattern onto an embossing roll. One especially preferred method is to engrave the embossing roll using a laser beam to control the pattern, the accuracy and quality of the matte finish and printed pattern on the embossing roll.

The films of the present invention are useful for making various articles which, in the past, have had material printed on them. The present invention eliminates the expenses associated with printing designs or information either directly on the article or on a label to be affixed to the article. The present invention eliminates the need for inks and the extra processing steps such as printing, drying or curing, as well as ink-related problems such as ink pick-off.

Various useful articles in which it would be advantageous to have predetermined patterns and/or printed information include such applications as medical bags, wrapping, pouches, labels and the like. In particular, one useful product comprises a bag having a patterned matte finish on the inside of at least one side of the bag to provide the bag with a lower coefficient of friction, thus allowing for easy removal or insertion of items from the bag.

In a preferred embodiment of the present invention, an extrusion slot type die is used to extrude a polymer material (for example, low to medium density polyethylene) as a polymer film through a nip area having a patterned matte finish embossing roll and a substantially smooth or non-embossing roll. In certain embodiments, the polymer is heated to a desired predetermined temperature prior to being introduced into the nip between the embossing roll and the substantially smooth roll. The polymer material is simultaneously formed into a film having both embossed areas and interrupted or unembossed areas.

Further features and advantages will be apparent from the following detailed description taken in conjunction with the accompanying drawings illustrating the invention and the claims appended hereto.

BRIEF DESCRIPTION OF THE DRAWINGS

FIG. 3 is an enlargement of the area shown in FIG. 1.

FIG. 4 is a greatly enlarged cross-sectional view of a one side partially matte embossed film adhered to a substrate.

FIG. 5 is a greatly enlarged cross-sectional view of a multi-layer one side partially matte embossed film.

DETAILED DESCRIPTION OF THE PRESENT INVENTION

One aspect of the present invention relates to a one side matte patterned embossed masking film which can be applied to a substrate having a rigid or smooth surface. According to the present invention, the film can be applied to the substrate immediately after the formation of the embossed masking film or at a later point in time after the film embossing process.

Figure 1:
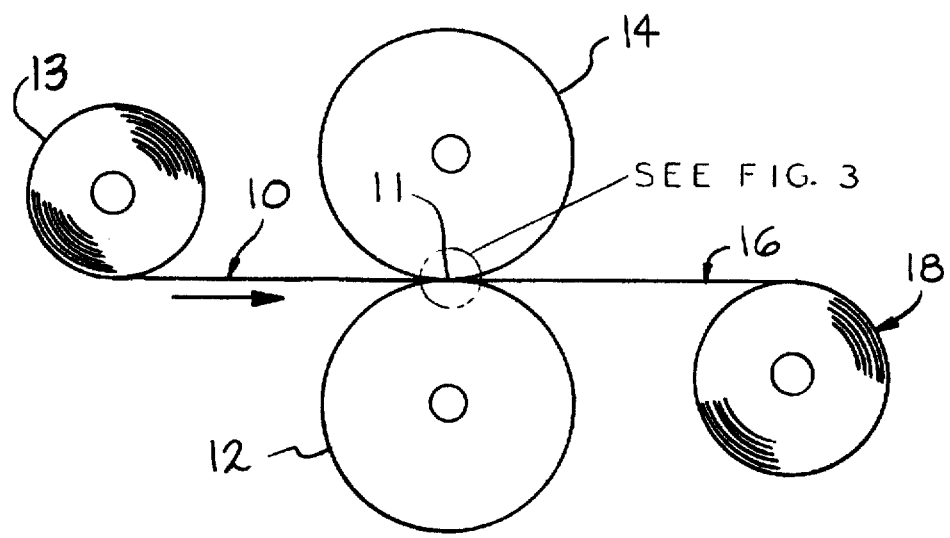
FIG. 1 is a schematic drawing of a one side matte embossed film being made.
Figure 2:
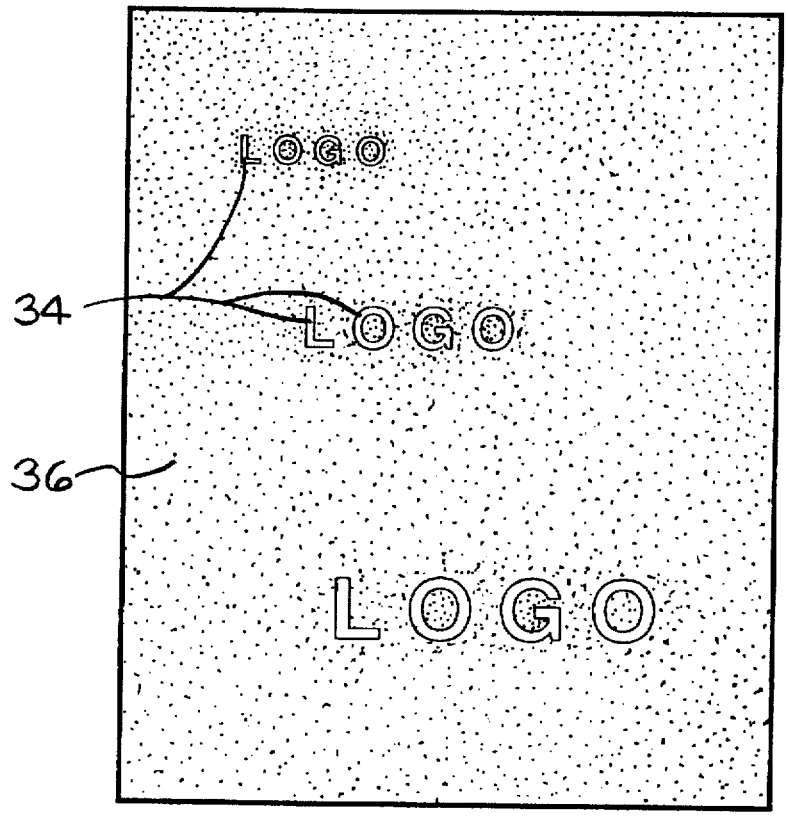
FIG. 2 is a plan view of a film having embossed areas and interrupted or unembossed areas.

FIG. 1 shows a supply of unembossed film 10 delivered from a roll 13. The embodiment shown in FIG. 1 reflects a previously formed supply of unembossed film. It should be understood, however, that in certain embodiments, the film material can be extruded directly into an embossing roll system in a molten or softened state. It is to be further understood that the film can be heated by any suitable means, including, for example, radiant heat or by passing the film over a heater roller (not shown). Continuous portions of the unembossed film 10 passes through a nip area 11 which is formed by an embossing roll 12 and a substantially smooth roll 14. The film 10 is formed into an embossed film 16 which is then wound on a roll 18. It is to be understood that while, not shown, various other rolls and treatments of the film, including corona treatment and the like, can be applied to the masking film as desired. FIG. 2 shows a plan view of a film having embossed areas and interrupted or uninterrupted areas.

FIG. 3 shows an enlargement of the nip area 11 between the embossing roll 12 and the smooth roll 14. It is to be understood that in certain preferred embodiments, the roll 14 can comprise a polished steel chrome roll or other material having a substantially smooth or mirror finish. However, it is also within the contemplated scope of the present invention that, in other embodiments, the roll 14 be a rubber or other elastomeric type material which does not emboss one side of the film. The pressure asserted at the nip area by the embossing roll 12 and the roll 14 varies depending upon the type and nature of the film being embossed. In preferred embodiments the pressure in the nip area can range from about 10 to about 350 pounds per linear inch. In preferred embodiments, the film thickness can range from about 0.5 to about 20 mils and the depth of the embossments on roll 12 range from about 15 to about 200 mils. It is to be understood that those skilled in the art understand the necessary limitations on pressure and preferred film thicknesses. These factors may be varied depending on the type of film material and the characteristics desired in the resulting masking film. In addition, process conditions such as temperature, pressure of the nip rollers, speed at which the film moves through the nip system and the like are controlled to produce an optimum film.

It is to be understood that, in certain embodiments, a roll 14 having a matte finish can be used as long as there is no substantial pressure of the film against the embossed roll 12.

In certain embodiments, it is to be understood that the smooth roll 14 and/or embossing roll 12 can be maintained within a predetermined desired temperature range. The rolls can either prevent a temperature drop in the preheated film during embossing or can remove heat from the film. As seen in FIG. 1, the rolls 12 and 14 are mounted in a counter-rotating manner to contact the film 10 and advance the film 10 through the nip area 11.

In a preferred embodiment, the embossing roll 12 comprises an elastomeric or rubber type material. In preferred embodiments, the embossing roll 12 can comprise silicone rubber compounds, Hypalon® rubber, ethylene propylene diene terpolymer (EPDM) or Neoprene® rubber material from Du Pont. Other useful compounds include crosslinked urethanes and the like. It should be understood that various other rubber or elastomeric type materials can be utilized in the embossing roll 12.

Referring now to FIG. 3, in particular, the embossing roll 12 has an outer surface 20 which defines an embossed or three-dimensional texture. The three-dimensional outer surface 20 comprising a plurality of microtextured portions 21 which provide a desired matte visual and texture effect with no observable pattern. The outer surface 20 of the embossing roll 12 also defines a plurality of openings or interruptions 22 arranged in a predetermined pattern on the outer surface 20. Each opening 22 is defined by at least one sidewall 24 and a base 26.

The predetermined pattern formed by the interruptions or openings 22 can comprise written words, artistic works, trademark or other brand identification information, or a combination of these predetermined patterns. In the preferred embodiments, the predetermined pattern, as designed by the plurality of openings or interruptions 22, covers less than about 50% of the surface area of the outer surface 20 of the roll 12. In certain preferred embodiments, the openings 22 define between about 1% to about 50%, and most preferably about 10% to about 25%, of the surface area of the roll 12. Thus, in certain embodiments, the embossed area of the film comprises about 1 to about 50%, and in certain embodiments about 10 to about 25% of the surface area of the partially embossed matte patterned side of the film. It is to be understood that the preferred amount of surface area defining the pattern depends, in part, upon the type of film being embossed and the amount of nip pressure the film is subjected to, and the desired aesthetic appearance of the film.

The film 10 is advanced between the roll 12 and the roll 14 at a point of interface 28. The film 10 has a first side 30 which is in contact with the embossing roll 12 and a second side 32 which is in contact with the roll 14. The nip pressure is preferably controlled so that the entire surface area of the second side 32 of the film 10 is brought into contact with the roll 14. As the film 10 passes through the point of interface 28, the openings or interruptions 22 in the surface 20 of the embossing roll 12 cause a plurality of portions 34 of the film 10 to pass through the nip area 11 without contacting the embossing roll 12, such that the portions 34 are unembossed. When an opening 22 is contiguous with the point of interface 28, as shown in FIG. 3, the portions 34 of the film 10 extend somewhat into the opening 22 and are unembossed.

The side walls 24 of each opening 22 have a predetermined depth such that as the film 10 passes through the interface 28, the plurality of portions 34 of the film 10 do not contact the base 26 of the opening 22. In preferred embodiments, the depth of the opening 22 ranges from about 15 to about 200 mils while the arithmetic mean roughness (Ra) in the embossing surface 20 ranges from about 10 to about 150 microinches (Ra) as measured with a profilometer. In preferred embodiments it is important that the depth of the openings 22 be sufficient to allow unembossed areas of film to be formed. In certain embodiments, there is an optimum range for the depth of the opening 22 since, if the opening 22 is too deep, the pressure being exerted as the film is being embossed may cause the sidewalls 24 to start to flex and undesirably cause the film 10 to touch the base 26 of the openings 22. The optimum depths for the openings are determined, in part, by the composition of the film material being partially embossed, the process operating parameters such as nip pressure applied, thickness of the film, temperature of the film, speed of the film, composition of embossing roll and the like. It is to be understood that such factors are to be taken into consideration when partially embossing a film according to the disclosure herein.

One advantage to having the openings 22 have a predetermined depth substantially greater than the thickness of the film 10 is that the circumference or outside diameter of the surface 20 of the embossed roll 12 can be evened out or "reground" if the surface 20 in some way becomes damaged or wears out. The outside diameter of the surface 20 can be reground (preferably each time the diameter is reduced by about 2 to about 5 mils) and still have useable patterns formed on the surface 20 of the embossed roll 12.

The roll 14 is preferably sufficiently inflexible such that the roll 14 does not substantially deflect as the film 10 passes through the point of interface 28 and does not cause the portions 34 of the film 10 to contact the base 26 of the opening 22.

As continuous portions of the film 10 pass through the point of interface 28, a plurality of other portions 36 of the film 10 contacts the embossed surface 20. The portions 36 receive an embossed or matte texture. Thus, the side 30 of the film is at least partially embossed with a predetermined precise pattern comprising unembossed portions 34 and embossed portions 36. The other side 32 is in contact with the roll 14 and remains substantially smooth and unembossed.

The roll 14 has continuous contact with the other side 32 of the film thus providing a smooth surface to the side 32 of the film 10. The resulting partially embossed film 16 thus has a repeating pattern of unembossed areas 34 which appear glossy in the non-contact areas and embossed areas 36. According to this invention, Ra is defined as the arithmetic average of the micropeaks to the center line of a particular finished surface as measured by a profilometer. This measurement is typically expressed in $10^{-6}$ microinches. In various embodiments, it is contemplated that the smooth side 32 of the masking film 10 have a smoothness in the range from about 0.25 to about 10 Ra and that the embossed areas 36 have a roughness or microtexture in the range of about 10 to about 150 Ra.

The smooth side and partially embossed side allow the film to be readily wound onto a roll, and thereafter unwound and applied to a suitable smooth substrate. As best shown in FIG. 4, the embossed film 16 has one side 32 which is substantially smooth and has another side 30 having embossed areas 36 and unembossed areas 34. The smooth side 32 of the masking film 16 is applied to any suitable substrate 38 being masked without the use of any adhesive. The masking film 16 adheres to a smooth surface 39 of the substrate 38 due largely to the intimate contact between the smooth surface of the masking film and the 15 smooth surface of the substrate. In certain embodiments, preferred substrates include polycarbonate substrates, especially polycarbonate sheets having a thickness above about 30 mils and polycarbonate films having a thickness of about 30 mils or less. In preferred embodiments, the substrates have a surface smoothness in the range of about 0.1 to about 150 Ra.

A variety of methods can be utilized for applying the masking film to the substrate. In various preferred embodiments, the masking film 16 is taken from the roll 18 and is applied directly to the substrate 38 by means of a nip roll (not shown) or other similar systems through which the film and substrate are passed. In this system, the smooth side 32 of the masking film 16 is applied to or pressed against the smooth side 39 of the substrate 38 at the same time, preferably at elevated temperatures or the temperature at which the substrate is being extruded. Other suitable techniques for forming articles being masked using the film of the present invention are readily apparent to those skilled in the art.

While the preferred embodiment uses films made of low, medium and high density polyethylene, films made of polypropylene, polyvinyl chloride, nylon, polyester or any thermoplastic polymer are all useful.

The matte embossed film can contain various fillers or additives to impart such characteristics to the matte embossed film as abrasion resistance, write-ability and improved die cuttability. Also, through the addition of certain additives, the embossed layer has the desired opacity and/or color surface characteristics. For example, various dyes or pigments can be added to the films such that the matte portions appear different than the glossy unembossed portions. The difference in light reflection and scattering allows for ready visualization of the pattern.

It is also within the contemplated scope of the present invention that the masking film can comprise a coextruded multi-layer film as shown in FIG. 5. The multi-layer film 40 comprises at least one adhesive resin layer 42 and at least one layer comprising a partially matte embossed thermoplastic material 44. The multi-layer film 40 can also have at least one or more core layers (not shown) interposed between the adhesive resin layer 42 and the matte embossed film layer 44. The adhesive resin layer 42 defines an outer side 46 having a smooth surface and an inner side 48. The layer 44 has a first, inside surface 50 and a second, outside surface 52 having embossed areas 53 and unembossed areas 54. The inner side 48 is immediately adjacent to the surface 50 of the partially matte embossed layer 44 of thermoplastic material. The relative thicknesses of the coextruded layers 42, 44 and core (not shown) can be varied and ultimately depend upon the desired end uses of the films. By use of a multi-layer masking film, it is possible to provide a masking film having certain desired properties. That is, each layer performs a specific function. In certain embodiments, the layer 42 can comprise a heat activated adhesive resin suitable for adhesion on a specific substrate. In certain embodiments, it is desired that the partially embossed layer 44 be comprised of a material which is readily embossable. The ratio of layer 42 to embossed layer 44 or core layer in the multi-layer masking film 40 can vary depending upon the desired characteristics of the multi-layer masking film. These ratios can be varied to accommodate the end use needs for abrasion resistance, stiffness, tensile strength, peel strength and the like.

The openings or interruptions 22 on the surface 20 of the embossed roll 12 can be made using different methods. In one preferred embodiment the method for forming the openings 22 on the surface 20 of the embossed roll 12 comprises using a laser engraving system to remove predetermined portions of matter in a predetermined pattern. The removed matter is evacuated so that no dust particles or other matter remains in the openings 22.

Another method for forming a partially embossed roll is to cast a rubber elastomeric material by crosslinking suitable rubber-type materials in a pre-engraved mold. Yet another method is to cover certain predetermined areas of an embossing roll made of an elastomeric-type material such that the predetermined covered area defines the desired pattern to be formed on the surface of the roll. The roll is subjected to a matte finish forming process (for example, sand blasting) to provide a matte surface to the exposed or uncovered areas. After the matte finish forming process is conducted, the covered areas are exposed leaving relatively glossy or shiny non-matte surface areas compared to the sand blasted areas. Still another method for forming a partially embossed roll is to apply a suitable protective cover on portions of a roll in a predetermined pattern. The roll is then chemically etched to form the matte surface on the unprotected areas of the roll. Thereafter, the covered portions are removed from the embossed roll, thereby exposing the predetermined pattern.

Thus, it can be seen that this invention enables the application of a masking film to a substrate having a smooth surface. The masking film is embossed on one side with a predetermined pattern which can comprise an artistic design and/or written text such as instructions.

Many other variations, modifications and alternate embodiments can be made in the article and the techniques herein before described, by those having experience in this technology, without departing from the concept of the present invention. Accordingly, it should be clearly understood that the article and methods referred to in the above description are illustrative only and are not intended as limitations on the scope of this invention, as defined in the following claims.

We claim:

1. A thermoplastic masking film for being removably adhered to a substantially smooth substrate, the film having a first side having a substantially smooth surface, the smooth surface being capable of being removably adhered to the substrate, and a second side having a patterned embossed surface, the patterned embossed surface comprising at least one unembossed area and at least one embossed area, wherein the patterned embossed surface extends over substantially the second side of the film.

2. The film of claim 1, wherein the patterned embossed surface of the second side comprises a plurality of embossed areas and a plurality of substantially smooth unembossed areas.

3. The film of claim 2 having a thickness ranging from about 0.5 to about 20 mils and the embossed areas have a depth ranging from about 10 to about 150 microinch arithmetic mean roughness (Ra).

4. The film of claim 1, wherein the unembossed area comprises about 1 to about 50% of the surface area of the patterned embossed surface of the film.

5. The film of claim 1, wherein the unembossed area comprises about 10 to abut 25% of the surface area of the patterned embossed surface of the film.

6. The film of claim 3, wherein the embossed areas have a matte surface in the range of about 10 to about 150 microinch Ra surface roughness.

7. The film of claim 1, comprising a thermoplastic film of polyethylene, polypropylene, polyvinylchloride, polyester, nylon or blends and copolymers thereof.

8. The film of claim 7, wherein the film contains additives to impart abrasion resistance, writeability and/or die cuttability.

9. The film of claim 1 comprising at least two layers of thermoplastic material.

10. The film of claim 9, wherein the film comprises at least one layer of an adhesive resin having a substantially smooth side, and at least one layer having a patterned embossed matte surface on the opposite side.

11. The film of claim 10, wherein one or more core layers are interposed between the adhesive resin layer and the embossed film layer.

12. The film of claim 9, wherein the film layers are coextruded from a die.

13. An article comprised of a substrate having a rigid or hard, smooth surface and having affixed thereto a thermoplastic masking film comprising a substantially smooth first side and a second side having a patterned embossed surface comprising a plurality of embossed areas and a plurality of substantially smooth unembossed areas, wherein the patterned embossed surface extends over substantially the second side of the film, the smooth side of the masking film being affixed to the smooth surface of the substrate, whereby the masking film removeably adheres to the surface of the substrate.

14. The article of claim 13, wherein the substrate is composed of polycarbonate, acrylic and/or other thermoplastic or thermoset materials.

15. The article of claim 13, wherein the substrate is composed of a polycarbonate sheet having a thickness above about 30 mils and having a surface smoothness in the range of about 0.1 to about 150 Ra.

16. The article of claim 13, wherein the substrate is composed of a polycarbonate film having a thickness of about 30 mils or less and having a surface smoothness in the range of about 0.1 to about 150 Ra.

17. The article of claim 13, wherein the embossed areas of the masking film have about 10 to about 150 Ra surface roughness.

* * * * *